United States Patent [19]

Bluestein et al.

[11] Patent Number: 4,738,899

[45] Date of Patent: Apr. 19, 1988

[54] TRANSPARENT ABRASION-RESISTANT FLEXIBLE POLYMERIC COATING

[76] Inventors: Claire Bluestein, 103 Sandpiper Key, Secaucus, N.J. 07094; Murray S. Cohen, 12 Symor Dr., Convent Station, N.J. 07961

[21] Appl. No.: 883,341

[22] Filed: Jul. 8, 1986

[51] Int. Cl.$^4$ .................. B05D 3/02; B05D 3/06; B32B 27/16; B32B 27/38

[52] U.S. Cl. .................. 428/413; 427/54.1; 428/417; 428/418; 522/25; 522/169; 522/170; 528/116; 528/354

[58] Field of Search .................. 427/54.1; 428/413; 522/20, 169, 170; 528/116

[56] References Cited

U.S. PATENT DOCUMENTS

| | | | |
|---|---|---|---|
| 4,250,203 | 2/1981 | Schlesinger et al. | 427/54.1 |
| 4,368,314 | 1/1983 | Endo et al. | 528/89 |
| 4,378,279 | 3/1983 | Smith | 427/54.1 |
| 4,387,215 | 6/1983 | Bailey | 528/354 |
| 4,593,051 | 6/1986 | Koleske | 427/54.1 |
| 4,599,155 | 7/1986 | Suzuki et al. | 522/12 |

FOREIGN PATENT DOCUMENTS

| | | |
|---|---|---|
| 1084733 | 7/1960 | Fed. Rep. of Germany . |
| 160193 | 6/1983 | German Democratic Rep. . |

*Primary Examiner*—Allan M. Lieberman

[57] ABSTRACT

A process for preparing an adhesive, transparent, corrosion and abrasion resistant polymeric coating on a substrate, such as a glass, plastic or metal such as aluminum or steel. The substrate is coated with a mixture of up to about 15% by weight of an expanding polycyclic monomer such as a spiroorthocarbonate or spiroorthoester, a diepoxy oligomer such as a diglycidyl ether, and a lactone in a concentration of from about 1:2.5 to 1:4.5 by weight of the oligomer. To this mixture is added a catalytic quantity of a boron trihalide-amine complex and a catalytic quantity of an aromatic photocatalyst which releases a carbonium ion upon ultraviolet irradiation. The coated substrate is exposed to broad wavelength UV light for from about 2 to 20 seconds to initiate polymerization. Polymerization of the coating is completed by heating the coated substrate at a temperature of from about 50° to 120° C. for a sufficient period to complete polymerization to a flexible, tough, abrasive and corrosion resistant transparent coating. If the substrate is very thin, the heating may be omitted, as determined by the artisan. Instead of heating to complete polymerization, a di- or tri- functional acrylate may be added to the initial mixture. Preferably, the expanding monomer is a spiroorthoester formed in situ by the reaction of a lactone such as γ-butyrolactone with an epoxide, as known in the art.

13 Claims, No Drawings

TRANSPARENT ABRASION-RESISTANT FLEXIBLE POLYMERIC COATING

FIELD OF THE INVENTION

Our invention relates to flexible, transparent, abrasion and corrosion-resistant, cohesive and adhesive polymeric coatings on a substrate and a process for coating a substrate. More particularly, the invention relates to a process of manufacturing these transparent polymeric coatings of good strength and durability, on a substrate, by polymerizing a mixture of a diepoxide oligomer, a polycyclic ring-opening monomer, and a lactone in at least a minor but indispensible amount into a transparent copolymer.

BACKGROUND OF THE INVENTION

Polycarbonate windows are widely used because of their resistance to breakage. However, polycarbonate windows, especially in airplanes and supersonic aircraft, for instance, are subject to abrasion and clouding due to the severe atmospheric conditions encountered at high speeds. This problem is a menace to both civilian and military aircraft.

Attempts to overcome this problem using silicone polymers and acrylic resin coatings for instance, met with limited success largely because such coatings lacked adequate adhesion and suffered loss of clarity.

PRIOR ART

U.S. Pat. No. 4,387,285 to Bailey, which is herein incorporated by reference, describes a product formed by the polymerization of polycyclic ring-opening monomers. Such a product is described as being a high-strength adhesive, and is formed by polymerizing a spiroorthoester or spiroorthocarbonate in the presence of a polymerization catalyst.

While such products appear useful as coatings they lack transparency and do not form a coherent and adhesive coating thereby rendering them useless as clear, transparent coatings.

German Democratic Republic Pat. No. 160,193 to Klemm describes polymerization of a preformed spirocyclic orthoester using triethyl oxonium hexachloroantimonate initiator and thermal polymerization. The products by this patent, although transparent, are described as suitable only for molding purposes and not as coatings.

It is an object of the invention to provide a superior, transparent, abrasion-resistant, flexible coating particularly on a substrate such as polycarbonate sheet or film.

It is another object of the present invention to provide a polymerized coating of reduced shrinkage.

It is a further object of the invention to provide a simple, inexpensive process for making a transparent, abrasion-resistant flexible coating on substrates such as polycarbonate sheet or film and on metal substrates such as aluminum or steel.

It is a still further object of the invention to prepare a coating composition which strongly adheres to a substrate even under the most severe atmospheric conditions while, at the same time, remaining transparent.

It is another object of the invention to provide a process of manufacturing a transparent polymeric coating on a substrate from readily available materials.

Another object is to provide a flexible smooth polymeric cohesive coating which covers uneven surfaces of a substrate being coated.

Still another object is to provide a flexible, transparent, polymeric coating which contains no volatile components.

It is yet another object to provide a hydrolytically stable polymeric coating for a substrate.

A further object of the invention is to provide a flexible transparent coating on a substrate by a process which does not pollute the environment.

These and further objects of the invention are achieved by the practice of this invention as hereindescribed.

SUMMARY OF THE INVENTION

In accordance with the present invention, the foregoing objects are achieved by catalytic polymerization with ultraviolet light for a few seconds of an expanding polycyclic ring-opening monomer, in a matrix of a growing diepoxy oligomer, and a lactone in a concentration of from about 1:2.5 to 1:4.5 by weight of the oligomer. The polycyclic ring-opening monomer may be a spiroorthoester which may be formed in situ from a lactone, such as $\gamma$-butyrolactone or $\epsilon$-caprolactone, as described in German Auslegeschrift No. 1,084,733, also incorporated herein by reference, or a spiroorthocarbonate, for instance, as described in the Bailey patent. A curative catalyst, such as a Lewis acid amine complex, as known in the art, is added to the mixture as well as an aromatic photocatalyst which releases a radical carbonium ion upon irradiation with ultraviolet light for initiating polymerization of the oligomer. Polymerization of the composite is then completed by the application of heat for a designated length of time, or by incorporating a di- or tri-functional acrylate initially, as herein described. Heat may not be required when the polymeric coating is applied to a very thin substrate, such as thin polycarbonate film, because the heat generated by irradiation is sufficient to complete polymerization.

The coatings produced by the process of this invention are hard and resilient, have good adhesion to the substrate, are hydrolytically stable, have reduced shrinkage, and have good scratch resistance together with good transparency and resist hazing even under very severe conditions. These polymeric coatings are particularly useful in coating polycarbonate substrates for instance, for aircraft windows, head and tail lamps, safety goggles and shields, and the like; and for coating industrial materials such as metals, to provide a clear corrosion-proof protective coating.

While the invention is about to be described with reference to specific examples, they are illustrative only, as other ingredients, such as other known monomers and oligomers may be added to the polymer compositions, as long as they do not interfere with the desired properties of the final coating.

In addition, flow aids, colorants, stabilizers, resiliency agents, and the like, as known in the art, can be incorporated therein.

DETAILED DESCRIPTION OF THE INVENTION

A diepoxide, preferably the diglycidyl ether of Bisphenol A or Bisphenol F of high quality such as "Quatrex®" sold by the Dow Chemical Co. of Midland, Mich., is mixed with up to about 15% by weight of a polycyclic monomer such as a spiroorthocarbonate, and even higher percentages of spiroorthoesters as described in the Bailey patent; and from about 1:2.5 to 1:4.5 percent by weight of the diepoxy oligomer, of a lactone, such as γ-butyrolactone or ε-caprolactone, is added to produce the best coatings according to the present invention. About 2%–12% by weight of an aryl cationic photocatalyst such as triphenyl sulfonium hexafluoro antimonate (herein referred to as FX-512), arsenate, or phosphate, are added to the mixture together with a Lewis acid-amine complex to accomplish polymerization on the substrate. Upon irradiation with ultraviolet light, the photocatalyst releases a radical carbonium ion initiating the polymerization of the diepoxide oligomer at ambient temperatures. The irradiation with ultraviolet light should be for about 2 to 20 seconds to initiate polymerization of the diepoxide oligomer. This is essential in order that the oligomer begins to polymerize before the polycyclic monomer begins to polymerize. As the oligomer polymerizes, it forms a lattice structure into which the expanding monomer, as it polymerizes, appears to penetrate.

A second catalyst for the polycyclic monomer such as a Lewis acid-tertiary amine complex, like boron trichloride N,N'-dimethyl piperazine salt hereinafter referred to as "Curative H", boron trifluoride monoethylamine salt, orthophenylene diamine-boron trifluoride salt, or 4,4' diamine diphenylsulfone-boron trichloride salt, as known in the art, is also added to the mixture in a catalytic amount, i.e. about 0.2%–1.0% by weight, to promote the ring-opening polymerization of the polycyclic monomers as described in the foregoing Bailey patent.

About 1%–4% of a flow-aid as known in the art such as FC-430 a fluorocarbon sulfonic acid salt, sold by the 3M Corporation of St. Paul, Minn., although not essential to the polymerization, is added to facilitate a uniform mixture and enhance the polymerization and give a smoother coating.

The foregoing mixture is then applied to a substrate, such as a polycarbonate, or a metal such as aluminum or steel, rigid vinyl, polyesters and polystyrenes. The coated substrate is then irradiated under ultraviolet light of about 200–300 W/inch, for from 2–20 seconds to initiate polymerization of the diepoxide oligomer. Too little irradiation results in incomplete initial polymerization and too much will result in too fast a cure leaving some of the spiro monomer unreacted.

After irradiation, the coated substrate is exposed to a temperature of from about 50° C. to 125° C. for about 0.5 hours to about 20–30 hours, as predetermined, to yield a clear transparent coating on the substrate. Of course, if a thin polycarbonate or vinyl substrate is used, or if a di- or tri-functional acrylate, such as trimethylolpropane triacrylate is added to the coating mixture, additional heat, as mentioned above, may be omitted. In addition, when a substance such as steel is coated higher temperatures may be applied.

The spiroester monomer of the present invention is formed in situ from γ-butyrolactone, for instance, as described in German Pat. No. 1,084,733 to Bayer, incorporated herein by reference. However, the monomer may be added per se, but it is preferred to have a lactone in the mixture in an amount as set forth herein. If no monomer is added, it is preferred to use a concentration of lactone in the upper range, i.e. about 1 to 2.5 by weight of the oligomer, but this is not essential.

Other ingredients such as prepolymers, as known in the art, may be added to the polymer coating so long as they do not interfere with the desired properties of the final coatings. In addition, flow-aids, pigments, deaerating agents, stabilizers, metal deactivators, and the like as known in the art, can be incorporated into the present polymer mixture.

EXAMPLE 1

Epoxy coating compositions were prepared from premanufactured norbornene spiroorthocarbonate (NSOC), Quatrex ® 1010, γ-butyrolactone, containing Catalysts Curative H and FX512. The spiroorthocarbonate, NSOC, was ballmilled at 50 wt % in γ-butyrolactone until the particle size was about 1 micron or less. Curative H was predissolved to make a 10 wt % solution in either γ-butyrolactone, or in Quatrex 1010. The coating ingredients were blended by weight to make a smooth dispersion. About 1% of fluorosurfactant FC430 was added to keep the dispersion stable.

The coatings were drawn down with wire wound bar rods on ⅛" thick Tuffak polycarbonate sheet, exposed to ultraviolet light, (200 watts/in. mercury lamp) until tacky, then placed in an oven at about 100°–110° C. to complete the cure. Clear or slightly hazy cohesive and adhesive coatings were obtained with the compositions in Table I. Cloudy and/or non-cohesive coatings which could readily be scratched off polycarbonate were obtained with compositions in Table II.

EXAMPLE 2

Epoxy coatings compositions were prepared in a manner similar to that described in Example 1, except that no premanufactured spiroorthocarbonate (NSOC) was added. After curing under UV light and thermally, those compositions listed in Table III, together with cure conditions, gave clear cohesive coatings which had good adhesion to polycarbonate sheet. Those compositions as listed in Table IV which had no exposure to UV light or which were exposed to thermal cure before UV light exposure did not give clear, cohesive and adhesive coatings.

EXAMPLE 3

An epoxy coating composition was prepared from Quatrex 1010, Curative H and FX512 similar to those described in Examples 1 & 2, except that no γ-butyrolactone (BLO) was added. It was cured in a similar manner with exposure to UV light and then at 110° C. for 14 hours. A hard clear coating was produced which had no adhesion to polycarbonate sheet.

EXAMPLE 4

An epoxy coating composition was prepared for coating on polycarbonate (Lexan ®) film. The coating components were blended by mixing and contained 52 parts Quatrex 1010, 2 parts 10% Curative H in Quatrex 1010, 12.8 parts BLO, 10 parts FX512, 20 parts ethoxylated trimethyolpropanetriacrylate, and 4 parts FC430. This coating was drawn down on the film with a #2 Maier bar and cured under UV light at approximately 250 feet per minute. The cured coating was clear, had good scratch resistance (steel wool) and adhesion (scotch tape test). Further, in comparison with UV-cured acrylate coated polycarbonate, this epoxy coated film could be folded and creased without formation of stress cracking lines.

EXAMPLE 5

A coating composition was prepared similar to that described in Example 3, except that 1.5% m-xylylene diamine was included in the composition. The cured coating was cloudy and did not adhere to the polycarbonate.

EXAMPLE 6

A coating composition was prepared similar to those in Example 2, except that $BF_3$ monoethylamine was used in place of Curative H. The coating did not cure under the same cure conditions. To cure, it was necessary to heat the polycarbonate to temperatures above 130° C., which caused the polycarbonate to soften and deform.

EXAMPLE 7

A coating composition was prepared in a similar manner to those coatings described in example 2, except that no cationic curative such as Curative H or any other cationic thermally activated catalyst was included. The UV activated catalyst FX-512 was included at 7.5 parts by weight. The coating was cured under UV light for 12 seconds and remained somewhat tacky. It was then placed in the oven at 110° C. The coating hardened, but became very cloudy and did not adhere well to the polycarbonate.

TABLE I

Identification of Ring-Opening Polymer Coatings, Compositions and Cure Schedules

| Coating # * | Quatrex ® (parts) | Ratio Q/BLO | NSOC (parts) | Cur H (parts) | FX512 (parts) | UV Cure (Seconds) | Thermal Cure (temp'C.) | Thermal Cure (hours) |
|---|---|---|---|---|---|---|---|---|
| 1 | 65 | 2.6/1 | 4.3 | 0.86 | 4.3 | Y | 130 | 14 |
| 2 | 65 | 2.6/1 | 4.3 | 0.86 | 4.3 | Y | 130 | 14 |
| 3 | 6.81 | 3.8/1 | 4.1 | 8.2 | 8.2 | Y | 110 | 8 |
| 4 | 66.4 | 4/1 | 5.0 | 0.20 | 10.0 | Y | 110 | 14 |
| 5 | 66.4 | 4/1 | 5.0 | 0.20 | 10.0 | Y | 110 | 14 |
| 6 | 58.5 | 3/1 | 10.0 | 0.2 | 10.0 | Y | 110 | 20 |
| 7 | 55 | 2.7/1 | 12.2 | 0.18 | 10.0 | Y | 110 | 22 |

*Abbreviations and Symbols
Q = Quatrex 1010 (diglycidylether of bisphenol A)
BLO = Γ-Butyrolactone
Y = Yes, UV cure between 3 and 20 seconds
N = None

TABLE II

Identification of Ring-Opening Polymer Coatings, Compositions and Cure Schedules

| Coating # * | Quatrex ® (parts) | Ratio Q/BLO | NSOC (parts) | Cur H (parts) | FX512 (parts) | UV Cure (Seconds) | Thermal Cure (temp'C.) | Thermal Cure (hours) |
|---|---|---|---|---|---|---|---|---|
| 1 | 79 | 4.3/1 | 5.6 | 0.11 | 0 | N | 130 | 8 |
| 2 | 72 | 3.2/1 | 4.76 | 0.38 | 0 | N | 130 | 40 |
| 3 | 64 | 2.6/1 | 6.3 | 0.1 | 4.2 | Y | 130 | 20 |
| 4 | 75 | 4/1 | 5.55 | 0.22 | 0 | N | 110 | 2 |
| 5 | 75 | 4/1 | 5.55 | 0.22 | 0 | N | 110 | 14 |
| 6 | 70 | 3.5/1 | 7.78 | 0.20 | 0 | N | 110 | 14 |
| 7 | 70 | 3.5/1 | 7.78 | 0.20 | 0 | N | 110 | 14 |
| 8 | 66 | 3/1 | 10.0 | 0.20 | 0 | N | 110 | 24 |
| 9 | 66 | 3/1 | 10.0 | 0.20 | 0 | N | 110 | 14 |
| 10 | 62 | 2.7/1 | 12.2 | 0.18 | 0 | N | 110 | 18 |
| 11 | 62 | 2.7/1 | 12.2 | 0.18 | 0 | N | 110 | 14 |
| 12 | 60 | 4/1 | 8 | 5.0 | 11.5 | Y | 110 | 14 |
| 13 | 61 | 4/1 | 8 | 3.0 | 11.5 | Y | 110 | 14 |

*Abbreviations and Symbols
Q = Quatrex 1010
BLO = Γ-Butyrolactone
Y = Yes, UV cure between 3 and 20 seconds
N = None

TABLE III

Identification of Ring-Opening Polymer Coatings, Compositions and Cure Schedules

| Coating # * | Quatrex ® (parts) | Ratio Q/BLO | NSOC (parts) | Cur H (parts) | FX512 (parts) | UV Cure (Seconds) | Thermal Cure (temp'C.) | Thermal Cure (hours) |
|---|---|---|---|---|---|---|---|---|
| 1 | 68.6 | 2.6/1 | 0 | 0.4 | 4.5 | Y | 130 | 16 |
| 2 | 68 | 4/1 | 0 | 1.89 | 10.75 | Y | 110 | 14 |
| 3 | 69 | 4/1 | 0 | 0.25 | 10.75 | Y | 110 | 14 |
| 4 | 69 | 4/1 | 0 | 0.50 | 10.75 | Y | 110 | 14 |
| 5 | 69 | 4/1 | 0 | 0.75 | 10.75 | Y | 110 | 14 |
| 6 | 69 | 4/1 | 0 | 1.0 | 10.75 | Y | 110 | 14 |
| 7 | 69 | 4/1 | 0 | 0.10 | 10.75 | Y | 110 | 14 |
| 8 | 74 | 4/1 | 0 | 0.10 | 5.71 | Y | 110 | 5 |
| 9 | 58 | 2/1 | 0 | 0.19 | 10.75 | 4 | 110 | 3 |
| 10 | 58 | 2/1 | 0 | 0.19 | 10.75 | 8 | 110 | 3 |
| 11 | 58 | 2/1 | 0 | 0.19 | 10.75 | 12 | 110 | 3 |
| 12 | 65 | 3/1 | 0 | 0.19 | 10.76 | 4 | 110 | 14 |
| 13 | 65 | 3/1 | 0 | 0.19 | 10.76 | 8 | 110 | 14 |
| 14 | 65 | 3/1 | 0 | 0.19 | 10.76 | 12 | 110 | 14 |
| 15 | 72 | 3/1 | 0 | 0.19 | 2.0 | 4 | 110 | 24 |
| 16 | 72 | 3/1 | 0 | 0.19 | 2.0 | 8 | 110 | 20 |

TABLE III-continued

Identification of Ring-Opening Polymer Coatings, Compositions and Cure Schedules

| Coating # * | Quatrex ® (parts) | Ratio Q/BLO | NSOC (parts) | Cur H (parts) | FX512 (parts) | UV Cure (Seconds) | Thermal Cure (temp'C.) | Thermal Cure (hours) |
|---|---|---|---|---|---|---|---|---|
| 17 | 72 | 3/1 | 0 | 0.19 | 2.0 | 12 | 110 | 18 |
| 18 | 71 | 3/1 | 0 | 0.19 | 3.0 | 12 | 110 | 18 |
| 19 | 71 | 3/1 | 0 | 0.19 | 3.0 | 8 | 110 | 14 |

*Abbreviations and Symbols
Q = Quatrex 1010
BLO = Γ-Butyrolactone
Y = Yes, UV cure between 3 and 20 seconds
N = None

TABLE IV

Identification of Ring-Opening Polymer Coatings, Compositions and Cure Schedules

| Coating # * | Quatrex ® (parts) | Ratio Q/BLO | NSOC (parts) | Cur H (parts) | FX512 (parts) | UV Cure (Seconds) | Thermal Cure (temp'C.) | Thermal Cure (hours) |
|---|---|---|---|---|---|---|---|---|
| 1 | 58 | 2/1 | 0 | 0.19 | 10.75 | N | 110 | 5 |
| 2 | 58 | 2/1 | 0 | 0.19 | 10.75 | 2 | 110 | 10 |
| 3 | 65 | 3/1 | 0 | 0.19 | 10.76 | N | 110 | 14 |
| 4 | 72 | 3/1 | 0 | 0.19 | 2.0 | N | 110 | 14 |
| 5 | 71 | 3/1 | 0 | 0.19 | 3.0 | 12 | 110 | (¼ before, 14 after) |

*Abbreviations and Symbols
Q = Quatrex 1010
BLO = Γ-Butyrolactone
N = None

While the invention has been described with reference to specific examples and ingredients, it is to be understood that the invention is broader and more encompassing and allows the substitution of ingredients and addition of substances having no material effect thereon. The invention is defined solely by the appended claims.

What is claimed is:

1. A process for preparing a flexible, transparent, cohesive and adhesive coating on a substrate, comprising the steps of:
    (a) forming a mixture of up to about 15% by weight of a polycyclic monomer selected from the group consisting of a spiroorthocarbonate and a spiroorthoester with a combination of a di-epoxy oligomer and a lactone in a ratio of from about 1:2.5 to about 1:4.5 by weight of the oligomer;
    (b) adding a Lewis acid catalyst
    (c) adding an aryl cationic photocatalyst to the mixture which releases a radical carbonium ion upon irradiation with broad wavelength ultra-violet light, and initiates polymerization of the oligomer;
    (d) coating the mixture on the substrate;
    (e) exposing the coated substrate to broad wavelength ultra-violet light for from about 2 to 20 seconds to initiate polymerization of the oligomer; and
    (f) completing polymerization to form the transparent, cohesive, and adhesive coating on the substrate by heating the ultraviolet light exposed substrate at between about 50° and 125° C.

2. A process as in claim 1 wherein a flow-aid is added to the mixture before coating on the substrate.

3. A process as claimed in claim 1 in which the monomer is a polycyclic ring system, the rings being opened during polymerization.

4. A process as in claim 1, wherein the diepoxy oligomer is a diglycidyl ether.

5. A process as in claim 1, wherein the catalyst for the monomer is a Lewis acid-amine complex.

6. A process as in claim 5, wherein the catalyst is a complex of boron trichloride with N,N'-dimethyl piperazine.

7. A process in claim 1 wherein the diepoxy oligomer is Bisphenol-A diglycidyl ether.

8. A process as in claims 1 or 7, wherein the catalyst for the oligomer is a photocatalyst selected from the group consisting of triarylsulfonium hexafluoro antimonate, arsenate, and phosphate.

9. A process as in claim 1 wherein the monomer spiroorthoester is formed in situ by the reaction of a lactone with a diepoxy oligomer.

10. A process as in claim 9 wherein the lactone is γ-butyrolactone.

11. A process as in claim 9 wherein the lactone is ε-caprolactone.

12. A process as in claim 1, in which the spiroorthocarbonate monomer is norbornene spiroorthocarbonate.

13. A smooth, flexible, transparent, adherent, corrosion and abrasion-resistant coating on a substrate, said coating consisting essentially of copolymerized diepoxide oligomer and a ring-opening polycyclic monomer selected from the group consisting of a spiroorthocarbonate and a spiroorthoester, and said coating being obtained in accordance with the process defined in claim 1.

* * * * *